United States Patent
Koh

[11] Patent Number: 6,026,114
[45] Date of Patent: Feb. 15, 2000

[54] TRANSMITTING AND RECEIVING APPARATUS OF TIME DIVISION FULL-DUPLEX SPREAD SPECTRUM COMMUNICATION SYSTEM

[76] Inventor: Hyung Koh, San 14, Nongseo-ri, Kiheung-eup, Yongin-gun, Kyungki-do, Rep. of Korea

[21] Appl. No.: 08/772,552

[22] Filed: Dec. 26, 1996

[30] Foreign Application Priority Data

Dec. 27, 1995 [KR] Rep. of Korea .................. 95-59434

[51] Int. Cl.[7] ............................................... H04B 1/69
[52] U.S. Cl. .......................... 375/200; 375/206; 375/219; 455/78; 455/86; 370/280; 370/294
[58] Field of Search .................................. 375/200, 206, 375/219; 370/278, 280, 282, 294, 339; 455/78, 86, 87

[56] References Cited

U.S. PATENT DOCUMENTS

| | | | |
|---|---|---|---|
| 5,276,913 | 1/1994 | Lee et al. .................................... | 455/76 |
| 5,319,799 | 6/1994 | Morita ........................................ | 455/78 |
| 5,515,364 | 5/1996 | Fague ........................................ | 370/278 |
| 5,717,719 | 2/1998 | Park et al. ................................. | 375/298 |
| 5,764,685 | 6/1998 | Tanaka et al. ............................. | 375/200 |

Primary Examiner—Don N. Vo
Attorney, Agent, or Firm—Dilworth & Barrese

[57] ABSTRACT

A transmitting and receiving apparatus of a time division full-duplex spread spectrum communication system prevents transmitting or receiving sensitivity from deteriorating because of the generation of only one oscillation frequency upon transmission or reception using a PLL. The transmitting and receiving apparatus includes a time division duplexer for switching between transmitting and receiving modes; an amplifier for amplifying a receiving signal; a first band pass filter for receiving the amplified receiving signal, and passing only a signal of a given band; a low pass filter for low pass filtering a received pseudonoise (PN) code and data as a square wave signal, and for converting the square wave signal into a sine wave signal; a main phase locked loop for generating a main oscillation frequency; a first mixer for generating a first intermediate frequency signal; a second band pass filter for passing only the first intermediate frequency signal; a fixed phase locked loop for generating different first and second oscillation frequencies in response to an externally supplied control voltage; a demodulator for mixing the first intermediate frequency signal with the second oscillation frequency, converting and amplifying the mixed signal into a second intermediate frequency signal, and demodulating the amplified signal as the PN code and data; a second mixer for mixing the first oscillation frequency signal with the main oscillation frequency, and generating a transmitting signal; and a third band pass filter for passing only the transmitting signal in a desired band.

8 Claims, 1 Drawing Sheet

TRANSMITTING AND RECEIVING APPARATUS OF TIME DIVISION FULL-DUPLEX SPREAD SPECTRUM COMMUNICATION SYSTEM

BACKGROUND OF THE INVENTION

1. Field of the Invention

The present invention relates to a transmitting and receiving apparatus of a time division full-duplex spread spectrum communication system and, more particularly, to a transmitting and receiving apparatus of a time division full-duplex communication system for transmitting or receiving one oscillation frequency during transmission or reception in synchronization with a lock time by using a phase locked loop (PLL) which rapidly converts its frequency according to a control voltage.

A transmitting and receiving apparatus according to the present invention is based on Korean Application No. 59434/1995 which is incorporated herein by reference.

2. Description of the Related Art

FIG. 1 shows a conventional transmitting and receiving apparatus of a time division full-duplex spread spectrum communication system of the prior art. In FIG. 1, an antenna 20 transmits or receives data via an air line. A time division duplexer (hereinafter, referred to as TDD) 21 switches transmitting and receiving modes at regular time intervals. A low noise amplifier (hereinafter, referred to as LNA) 22 amplifies a receiving signal to an amplified level and outputs the amplified receiving signal to a first band pass filter (hereinafter, referred to as BPF) 23 when the time division duplexer 21 is switched into the receiving mode. The first band pass filter 23 receives the amplified receiving signal and passes only a signal of a given band. A low pass filter (hereinafter, referred to as LPF) 28 low pass filters a received pseudonoise (PN) code and data as a square wave signal, and converts the square wave signal into a sine wave signal. A main PLL 29 generates a main oscillation frequency in response to the PN code and data converted into the sine wave signal. A first mixer 24 lowers the receiving signal passed from the first BPF 23 by the main oscillation frequency generated from the main PLL 29, and generates a first intermediate frequency signal which is output to a second BPF 25. The second BPF 25 passes only the first intermediate frequency signal.

A first oscillator 26 generates a first oscillation frequency. A demodulator 27 mixes the first intermediate frequency signal passed from the second band pass filter 25 with the first oscillation frequency generated from the first oscillator 26 and converts the mixed signal into a second intermediate frequency signal. Further, the demodulator 27 amplifies the converted second intermediate frequency signal and demodulates the PN code and data. A second oscillator 30 generates a second oscillation frequency. A second mixer 31 mixes the second oscillation frequency signal generated from the second oscillator 30 with the main oscillation frequency generated from the main PLL 29 and generates a transmitting signal. A third BPF 32 receives the transmitting signal generated from the second mixer 31 and passes only the transmitting signal in a desired band. An amplifier 33 amplifies the transmitting signal passed from the third BPF 32 to a desired power level to be output. At this time, the time division duplexer 21 selects the transmitting mode and transmits the transmitting signal amplified from the amplifier 33 through the antenna 20 to the air line.

In the prior art transmitting and receiving apparatus of the time division full-duplex spread spectrum communication system as shown in FIG. 1, it is difficult to switch on or off the respective oscillation frequencies generated due to the use of rapid time division. The first and second oscillators implement transmitting or receiving operation at different frequencies under the state that they are continuously switched on, and thus the first and second oscillation frequencies are mutually subject to interference. Therefore, the transmitting or receiving sensitivity may deteriorate. Moreover, since two oscillators are used, the construction of a circuit is complicated and requires extra components.

SUMMARY OF THE INVENTION

It is therefore an object of the present invention to provide a transmitting and receiving apparatus of a time division full-duplex spread spectrum communication system for preventing transmitting or receiving sensitivity from being lowered by generating only one oscillation frequency upon transmission or reception using a second PLL, thereby solving the foregoing interference problem.

It is another object of the present invention to provide a transmitting and receiving apparatus of a time division full-duplex spread spectrum communication system for simplifying the construction of a circuit by generating one oscillation frequency during transmitting or receiving operation by using a second PLL.

In accordance with one aspect of the present invention, a transmitting and receiving apparatus of a time division full-duplex spread spectrum communication system includes: an antenna for transmitting or receiving data via an air line; a time division duplexer for switching transmitting and receiving modes at regular time intervals; a low noise amplifier for amplifying a receiving signal to a given level when the time division duplexer is switched to the receiving mode; a first band pass filter for receiving the amplified receiving signal, and passing only a signal of a given band; a low pass filter for low pass filtering a received PN code and data as a square wave signal, and for converting the square wave signal into a sine wave signal; a main phase locked loop for generating a main oscillation frequency in response to the PN code and data converted into the sine wave signal; a first mixer for lowering the frequency of a receiving signal passed from the first band pass filter by the main oscillation frequency generated from the main phase locked loop, and generating a first intermediate frequency signal; a second band pass filter for passing only the first intermediate frequency signal; a fixed phase locked loop for generating different first and second oscillation frequencies in response to an externally supplied control voltage; a demodulator for mixing the first intermediate frequency signal passed from the second band pass filter with the second oscillation frequency generated from the fixed phase locked loop, for converting the mixed signal into a second intermediate frequency signal, for amplifying the converted intermediate frequency signal, and for demodulating the amplified signal as the PN code and data; a second mixer for mixing the first oscillation frequency signal generated from the fixed phase locked loop with the main oscillation frequency generated from the main phase locked loop, and for generating a transmitting signal; a third band pass filter for receiving the transmitting signal generated from the second mixer, and for passing only the transmitting signal in a desired band; and an amplifier for amplifying the transmitting signal passed from the third band pass filter to a desired power level.

DETAILED DESCRIPTION OF THE PREFERRED EMBODIMENTS

Hereinafter, a preferred embodiment of the present invention is described with reference to the accompanying drawings.

Figure 2:
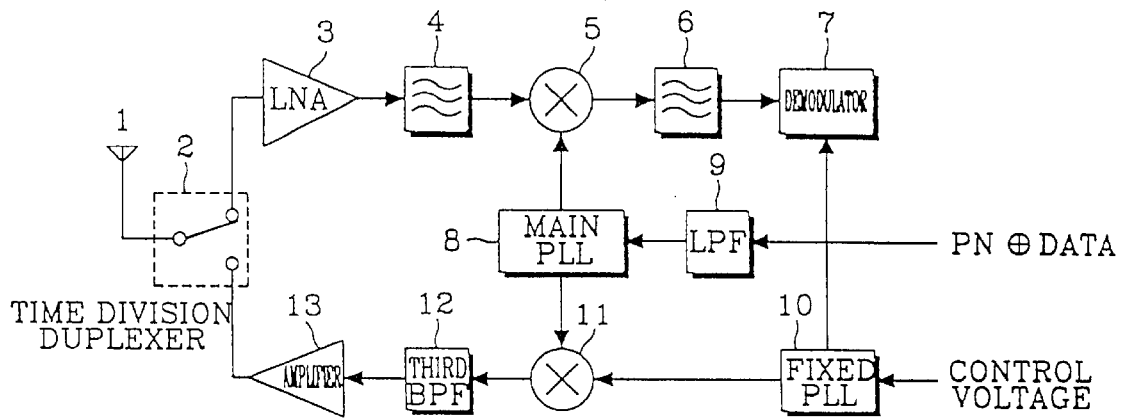
FIG. 2 is a block diagram illustrating a transmitting and receiving apparatus of a time division full-duplex spread spectrum communication system according to the present invention.
Figure 1:
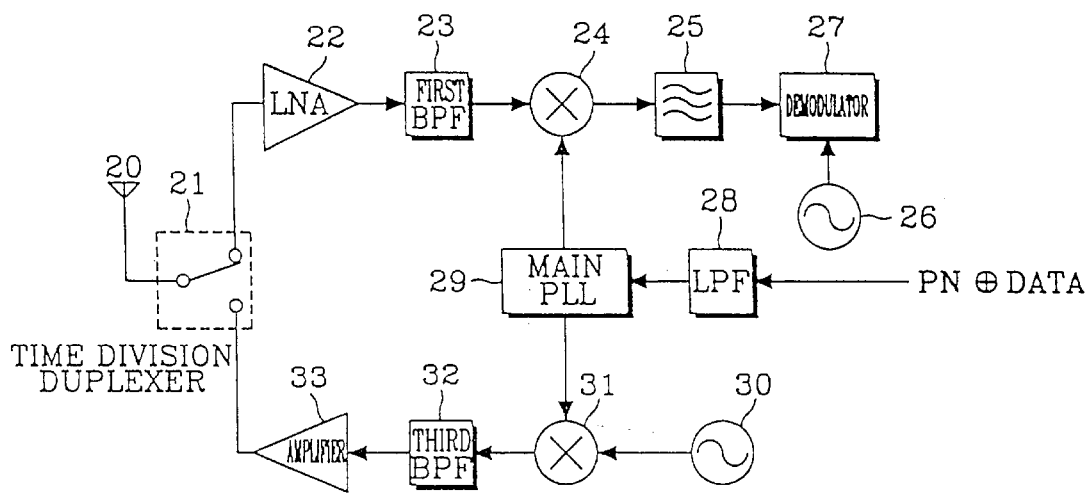
FIG. 1 is a block diagram illustrating a transmitting and receiving apparatus of a time division full-duplex spread spectrum communication system according to the prior art.

FIG. 2 is a block diagram illustrating a transmitting and receiving apparatus of a time division full-duplex spread spectrum communication system according to the present invention. With reference to FIG. 2, an antenna 1 transmits or receives data. A time division duplexer (TDD) 2 switches between transmitting and receiving modes at regular time intervals. A low noise amplifier (LNA) 3 amplifies a receiving signal to a given level and outputs the amplified receiving signal to a first band pass filter 4 when the time division duplexer 2 is switched into the receiving mode. The first band pass filter 4 receives the amplified receiving signal and passes only a signal of a given band. A low pass filter 9 low pass filters a received PN code and data as a square wave signal, and converts the square wave signal into a sine wave signal. A main PLL 8 generates a main oscillation frequency in response to the PN code and data converted into the sine wave signal. A first mixer 5 lowers the frequency of the receiving signal passed from the first BPF 4 by the main oscillation frequency generated from the main PLL 8, and generates a first intermediate frequency signal which is output to a second BPF 6. The second band pass filter 6 passes only the first intermediate frequency signal. A fixed PLL 10 generates different first and second oscillation frequencies in response to an externally supplied control voltage at regular intervals.

A demodulator 7 mixes the first intermediate frequency signal passed from the second band pass filter 6 with the second oscillation frequency generated from the fixed PLL 10 and converts the mixed signal into a second intermediate frequency signal. Further, the demodulator 7 amplifies the converted second intermediate frequency signal and demodulates the amplified signal as the PN code and data. A second mixer 11 mixes the first and second oscillation frequency signals generated from the fixed PLL 10 with the main oscillation frequency generated from the main PLL 8, thereby generating a transmitting signal. A third band pass filter 12 receives the transmitting signal generated from the second mixer 11 and passes only the transmitting signal in a desired band. An amplifier 13 amplifies the transmitting signal passed from the third band pass filter 12 to a desired power level. The time division duplexer 2 selects the transmitting mode and transmits the transmitting signal amplified from the amplifier 13 through the antenna 1 via the air line.

As described above, the transmitting and receiving apparatus of the time division full-duplex spread spectrum communication system according to the present invention generates a transmitting oscillation frequency during transmission and generates a receiving oscillation frequency during reception, respectively. The result of such operation is that, during transmission, the transmitting and receiving apparatus has no affect on the receiving oscillation frequency, and during reception, it has no effect on the transmitting oscillation frequency, thereby improving the transmitting and receiving sensitivity. Furthermore, since the transmitting and receiving oscillation frequencies can be generated by using one PLL instead of multiple oscillators, the construction of the circuit is simplified.

It should be understood that the present invention is described with reference to the illustrative embodiment disclosed herein as the best mode contemplated for carrying out the present invention, but the present invention is not limited to the illustrative embodiment described in this specification.

What is claimed is:

1. A transmitting and receiving apparatus of a time division full-duplex spread spectrum communication system comprising:

an antenna for transmitting or receiving data via an air line;

a time division duplexer for switching between transmitting and receiving modes at regular time intervals;

a low noise amplifier for amplifying a receiving signal to a given level when the time division duplexer is switched to the receiving mode;

a first band pass filter for receiving the amplified receiving signal, and for passing only a signal of a given band;

a low pass filter for low pass filtering a received pseudonoise (PN) code and data as a square wave signal, and for converting the square wave signal into a sine wave signal;

a main phase locked loop for generating a main oscillation frequency in response to the PN code and data converted into the sine wave signal;

a first mixer for lowering the frequency of a receiving signal passed from the first band pass filter by the main oscillation frequency generated from the main phase locked loop, and for generating a first intermediate frequency signal;

a second band pass filter for passing only the first intermediate frequency signal;

a fixed phase locked loop for generating different first and second oscillation frequencies in response to an externally supplied control voltage;

a demodulator coupled to the fixed phase locked loop and receiving the second oscillation frequency directly therefrom, for mixing the first intermediate frequency signal passed from the second band pass filter with the second oscillation frequency generated from the fixed phase locked loop, for converting the mixed signal into a second intermediate frequency signal, for amplifying the converted intermediate frequency signal, and for demodulating the amplified signal as the PN code and data;

a second mixer for mixing the first oscillation frequency signal generated from the fixed phase locked loop with the main oscillation frequency generated from the main phase locked loop, and for generating a transmitting signal;

a third band pass filter for receiving the transmitting signal generated from the second mixer, and for passing only the transmitting signal in a desired band; and an amplifier for amplifying the transmitting signal passed from the third band pass filter by a desired power.

2. The transmitting and receiving apparatus as claimed in claim 1, wherein the fixed phase locked loop generates the first oscillation frequency during the transmitting mode, and generates the second oscillation frequency during the receiving mode.

3. A method for use with a time division full-duplex spread spectrum communication system comprising the steps of:

switching between transmitting and receiving modes at regular time intervals;

amplifying a receiving signal to a given level during the receiving mode;

passing, in response to the amplified receiving signal, only a signal of a given band;

low pass filtering a square wave signal to generate a corresponding sine wave signal;

generating a main oscillation frequency in response to the sine wave signal using a first phase locked loop;

lowering the frequency of the passed amplified receiving signal using the main oscillation frequency to generate a first intermediate frequency signal;

passing only the first intermediate frequency signal;

generating different first and second oscillation frequencies by applying a control voltage to a fixed phase locked loop;

demodulating the first intermediate frequency signal using the second oscillation frequency supplied directly from the fixed phase locked loop;

mixing the first oscillation frequency signal with the main oscillation frequency to generate a transmitting signal;

passing only the transmitting signal in a desired band; and amplifying the transmitting signal.

4. The method as claimed in claim 3, wherein the step of generating first and second oscillation frequencies includes the steps of:

generating the first oscillation frequency during the transmitting mode; and generating the second oscillation frequency during the receiving mode.

5. The method as claimed in claim 3, wherein the step of generating includes the step of:

responding to an externally supplied control voltage.

6. The method as claimed in claim 3, wherein the step of switching includes the step of:

switching using a time duplexer.

7. The method as claimed in claim 3, further comprising the step of:

receiving a pseudonoise (PN) code and data as the square wave signal.

8. The method as claimed in claim 3, wherein the step of demodulating includes the steps of:

mixing the first intermediate frequency signal with the second oscillation frequency to generate a second intermediate frequency signal;

amplifying the second intermediate frequency signal; and demodulating the amplified second intermediate frequency signal as a pseudonoise (PN) code and data.

* * * * *